(12) United States Patent
Kovacevic et al.

(10) Patent No.: US 12,250,340 B2
(45) Date of Patent: Mar. 11, 2025

(54) SYSTEMS AND METHODS FOR IMPROVING AUDIO QUALITY USING FEEDBACK CONTROL

(71) Applicant: TEXTNOW, INC., Waterloo (CA)

(72) Inventors: Michael Kovacevic, Waterloo (CA); Alexandru Gabriel Roman, Waterloo (CA)

(73) Assignee: TEXTNOW, INC., Waterloo (CA)

( * ) Notice: Subject to any disclaimer, the term of this patent is extended or adjusted under 35 U.S.C. 154(b) by 426 days.

(21) Appl. No.: 17/637,354

(22) PCT Filed: Aug. 18, 2020

(86) PCT No.: PCT/IB2020/057779
§ 371 (c)(1),
(2) Date: Feb. 22, 2022

(87) PCT Pub. No.: WO2021/038385
PCT Pub. Date: Mar. 4, 2021

(65) Prior Publication Data
US 2022/0294898 A1 Sep. 15, 2022

Related U.S. Application Data

(60) Provisional application No. 62/890,768, filed on Aug. 23, 2019.

(51) Int. Cl.
*H04M 3/22* (2006.01)
*H04M 7/00* (2006.01)

(52) U.S. Cl.
CPC ......... *H04M 3/2227* (2013.01); *H04M 7/006* (2013.01)

(58) Field of Classification Search
CPC ..... H04M 3/2227; H04M 7/006; G10L 19/24; G10L 25/60
See application file for complete search history.

(56) References Cited

U.S. PATENT DOCUMENTS

| 11,937,065 B2 * | 3/2024 | Munoz | H04S 7/305 |
| 2013/0091526 A1 * | 4/2013 | Iyer | H04L 65/762 |
| | | | 725/62 |

(Continued)

FOREIGN PATENT DOCUMENTS

FR 2903836 A1 * 1/2008 ......... H04L 65/1026

OTHER PUBLICATIONS

Machine translated version of FR 2903836 (Year: 2008).*

(Continued)

*Primary Examiner* — Charles C Jiang
*Assistant Examiner* — Rachel Elizabeth Marks
(74) *Attorney, Agent, or Firm* — Perry + Currier Inc.

(57) ABSTRACT

An example communications system includes: a source device and a destination device; a Voice over Internet Protocol (VoIP) service, the VoIP service configured to support a voice call between the source device and the destination device over at least one of a wide-area IP network and a public-switched telephone network; wherein, for at least one leg in the voice call: an encoding device is configured to encode an analog audio stream to a digital audio stream according to one or more input parameters, the input parameters including variable input parameters; a receiving device is configured to send a quality indicator to the encoding device, the quality indicator representing the quality of the digital audio stream received at the receiving device; and the encoding device is configured to, at a feedback controller, determine updated variable input parameters for encoding a subsequent analog audio stream.

21 Claims, 5 Drawing Sheets

(56) References Cited

U.S. PATENT DOCUMENTS

2016/0110755 A1\* 4/2016 Smirnov ............ G06Q 30/0244
                                                    705/14.43
2017/0132199 A1   5/2017 Vescovi et al.
2020/0075032 A1\* 3/2020 Joseph .................... G10L 19/24

OTHER PUBLICATIONS

ScienceDirect, Digital Signal Processor, Signals and Systems using MATLAB (Third Edition), retrieved May 30, 2024 (Year: 2019).\*

\* cited by examiner

SYSTEMS AND METHODS FOR IMPROVING AUDIO QUALITY USING FEEDBACK CONTROL

FIELD

The specification relates generally to electronic communications, and more particularly to audio encoding in a communications system.

BACKGROUND

A telephone network operator ("Carrier") is a communications services provider that may have a fixed and/or wireless network infrastructure to provide communications services to its customers. A Carrier may utilize a combination of any number of technologies including those wireless technologies provided by any number of mobile network providers (such as cellular, LTE™) and those provided by any number of consumer establishments where Wi-Fi®, and the like, may be freely available to customers for Internet access. For the most part, Carriers are for-profit entities providing a communications service to the general public.

A Carrier may use Voice over Internet Protocol (VoIP) which is a technology that provides voice communications services and data communications services (e.g., multimedia sessions) over Internet Protocol (IP) networks, such as the Internet and/or private packet networks. Typically, a software telephony application using VoIP which can be installed on various devices such as handheld devices with Android or iOS operating systems, and desktop or laptop computers with Windows or Linux operating systems, for example. Further, VoIP technologies have evolved to include a telephone number for users and which include Short Message Service (SMS) for text messaging services.

SUMMARY

According to one aspect of the present specification, a communications system for improving audio quality using feedback control is provided. The communications system includes: a source device and a destination device, each coupled to one or more of a wide-area internet protocol (IP) network, a public-switched telephone network; a Voice over Internet Protocol (VoIP) service coupled to the wide-area IP network and the public-switched telephone network, the VoIP service configured to support a voice call between the source device and the destination device; wherein, for at least one leg in the voice call: an encoding device is configured to encode an analog audio stream to a digital audio stream according to one or more input parameters, the input parameters including variable input parameters; a receiving device is configured to send a quality indicator to the encoding device, the quality indicator representing the quality of the digital audio stream received at the receiving device; and the encoding device is configured to, at a feedback controller, determine updated variable input parameters for encoding a subsequent analog audio stream.

According to another aspect of the present specification, a communications device for improving audio quality using feedback control is provided. The communications device includes: an encoder configured to encode an analog audio stream to a digital audio stream according to one or more input parameters, the input parameters including variable input parameters; a communications interface configured to send the digital audio stream to a receiving device; and a feedback controller configured to: receive a quality indicator representing a quality of the digital audio stream received at the receiving device; determine, based on the quality indicator, updated variable input parameters; and provide the updated variable input parameters to the encoder.

According to another aspect of the present specification, a method for improving audio quality using feedback control is provided. The method includes: encoding, at an encoding device, an analog audio stream to a digital audio stream according to one or more input parameters, the input parameters including initial variable input parameters; sending the digital audio stream to a receiving device; receiving, at the encoding device, a quality indicator representing the quality of the digital audio stream received at the receiving device; determining, based on the quality indicator, updated variable input parameters; and providing the updated variable input parameters for encoding a subsequent analog audio stream.

BRIEF DESCRIPTION OF DRAWINGS

Implementations are described with reference to the following figures, in which.

DETAILED DESCRIPTION

The present specification generally relates to an electronic communications system providing electronic communications services (e.g., voice telephone calls, short message service or SMS messages, text-image-video-audio messages, general data communications, etc.). The communications system includes communication devices having VoIP telephone numbers. Further, each VoIP telephone number may be associated with one or more of the communications devices. While certain infrastructure may not operate under Internet Protocol (IP) (e.g., public switched telephone networks (PSTNs), cellular base station networks, etc.), communications are routed to and from such infrastructure using IP to the extent possible. The present specification also generally relates to providing communications services to communication devices where feedback control, and in particular, PID control is used to manage the audio quality of voice calls between the communication devices. Other aspects of the present invention will also become apparent in light of the following detailed description.

Proportional Integral Derivative (PID) control is most commonly used in industrial applications to stabilize the behavior of machines. However, PID control have also been used to maximize available bandwidth of a datagram-based network as shown in U.S. Pat. No. 9,185,043 (U.S. '043) entitled "Telecommunications Protocol with PID Control of Data Transmission" by inventor Robert Cousins dated Nov. 10, 2015. The computer data transmission systems and methods of U.S. '043 appears to use PID control to maximize the data transmission rate by manipulating the Interdatagram Delay. It may be advantageous to improve the communication services of VoIP telephone calls based on PID control.

Figure 1:
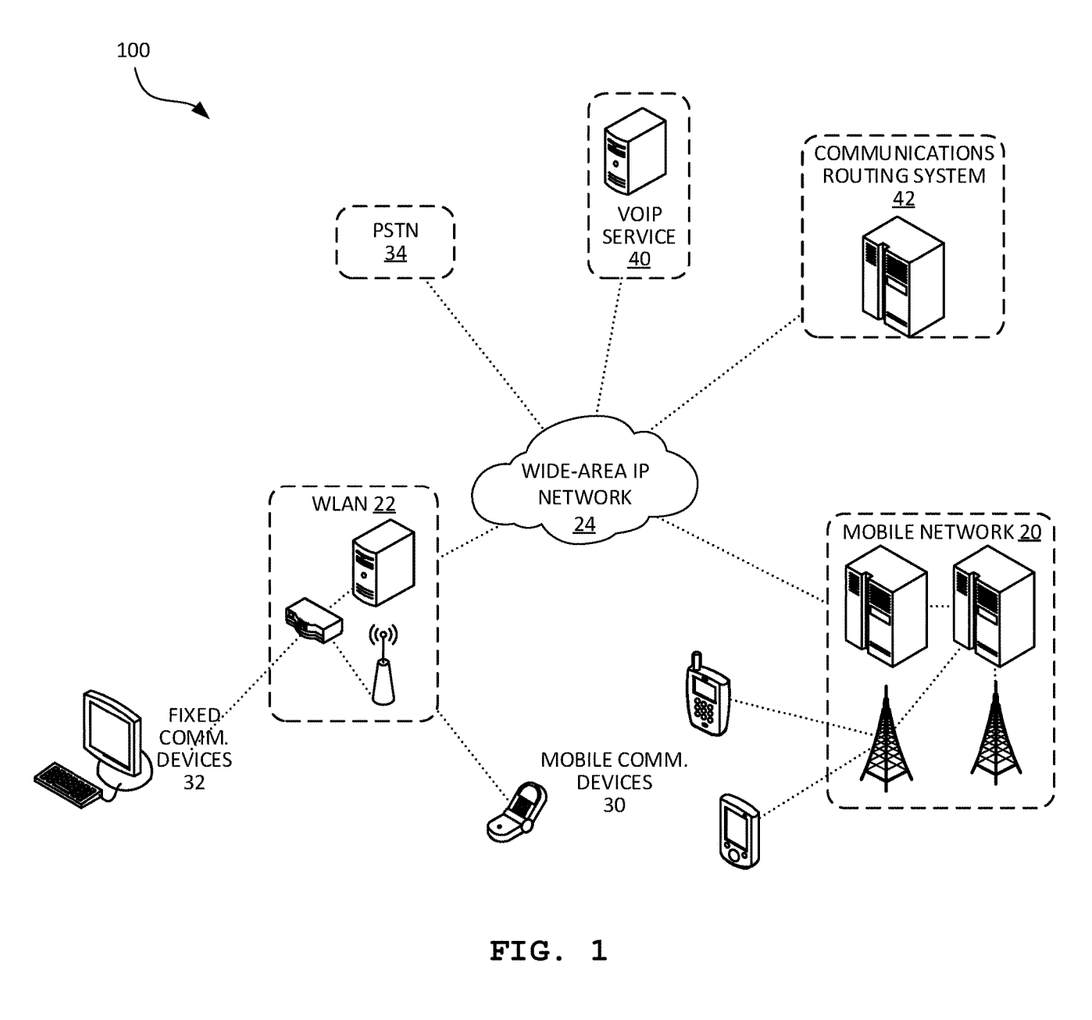
FIG. 1 depicts a schematic diagram of an example communications system for improving audio quality using feedback control.

FIG. 1 is a block diagram of an example communications system 100 which provides communications services and utilizes feedback control to manage the voice quality of telephone calls. The communications system 100 includes a plurality of networks, including a mobile network 20, a wireless local-area network (WLAN) 22, a wide-area internet protocol (IP) network 24, and a public-switched telephone network (PSTN) 34 providing network communications between a plurality of communications devices, such as mobile communications devices 30, and fixed communications devices 32. The communications system 100 also includes a Voice over Internet Protocol (VoIP) service 40 and a communications routing system 42 to manage communications in the communications system 100.

The mobile network 20 may be a wireless cellular network that operates under one or more known standards and technologies, such as Long Term Evolution (LTE), Worldwide Interoperability for Microwave Access (WiMAX), Enhanced Voice-Data Optimized (EVDO), Code Division Multiple Access (CDMA), HSPA (High Speed Packet Access), and similar. The mobile network 20 provides mobile network communications services, such as voice, data, and SMS services.

The WLAN 22 generally provides wireless network communication services and may operate under wireless local-area network standards and technologies, such as IEEE 802.11.

The mobile network 20 and the WLAN 22 each connect to the wide-area IP network 24, such as the Internet. The WLAN 22 can be connected to the wide-area IP network 24 by an Internet service provider (ISP) or the similar entity (not shown). The mobile network 20 can be connected to the wide-area IP network 24 by a packet data interface. For clarity of illustration, while FIG. 1 has lines showing communication between certain parts of the communications system 100, the various components (such as WLAN 22 via ISP and/or mobile network 20) connected to the wide-area IP network 24 may be configured to communicate with each other. Further, some parts of the communications system 100 are not shown to enhance clarity.

The mobile communications devices 30 are generally configured to connect to one or more of the networks to provide communications. For example, the mobile communications devices 30 can connect to the mobile network 20, for example via base stations and other infrastructure. The mobile communications devices 30 may further connect to the WLAN 22, via access points or similar. Examples of suitable mobile communications devices 30 include devices such as cellular telephones, smartphones, tablet computers, and the like that are provided with wireless communications interfaces suitable for the particular technologies used in the mobile network 20 and the WLAN 22. For sake of discussion it is assumed that all of the mobile communications devices 30 can connect to the mobile network 20 and WLAN 22. In particular, the mobile communications devices 30 may be simultaneously connected to both the mobile network 20 and the WLAN 22. While the mobile network 20 may generally provide a better performing data channel than the WLAN 22 for voice calls, the WLAN 22 may provide the data channel free of charge to users. In various implementations, different mobile communications devices have different types of wireless communications interfaces, different configurations, and/or different access rights suitable for connection to different mobile networks and different WLANs.

The fixed communications devices 30 are generally configured to connect to the WLAN 22, for example via a router or wired access point. The fixed communications devices 30 are generally stationary or relatively fixed and may include, for example, desktop computers, laptop or wi-fi only devices, servers, or similar. For clarity, the term communications devices 30, 32 may mean mobile communications devices 30 and/or fixed communications devices 32, as applicable.

The PSTN 34 supports a plurality of landline telephones and additional mobile networks (not shown). For example, the PSTN 34 may connect additional mobile networks having the same or similar features of the mobile network 20 which are operated by different carriers and/or operated according to different technologies and standards as compared to the mobile network 20. For clarity, the mobile communications devices 30 connected to the mobile network 20 may also initiate or receive voice calls directly from the PSTN 34 via the mobile network 20. Further, such voice calls, for example, may be via GSM (Global System for Mobile communication) from the mobile network 20. For convenience, such voice calls via the mobile network 20 in this disclosure are referred to as via a "voice channel". This is in contrast to VoIP voice calls using a "data channel" of the mobile network 20 such as the Packet Data Channel of GPRS (General Packet Radio Service).

The VoIP service 40 is generally configured to manage IP data streams related to VoIP communications services (for example, routing the IP data stream from communications devices 30, 32 to other communications devices 30, 32). That is, VoIP calls are streamed through the VoIP service 40. The VoIP service 40 thus interfaces with the wide-area IP network 24, the mobile network 20 and the PSTN 34 (and, as applicable, additional mobile networks) to manage VoIP calls. The VoIP service 40 may operate using one or more protocols, such as the Session Initiation Protocol (SIP), and one or more audio codecs, such as Opus. In particular, the VoIP service 40 may be configured to transcode IP data streams to be compatible with different networks (e.g., between the mobile network 20 and the PSTN 34). In some implementations, the VoIP service may be a subcomponent of the mobile network 20. In the present example communications system 100, the VoIP service 40 may act as a central point where digital audio streams of telephone calls are handled and handed off between endpoint communication devices 30, 32 and/or endpoint communication devices outside of the communications system 100.

The communications system 100 further includes the communications routing system 42 connected to the VoIP service 40 and the mobile network 20 via the wide-area IP network 24. In some implementations, the VoIP service 40 is directly connected to the communications routing system 42 via a local IP network distinct from the wide-area IP network 24. The communications routing system 42 is configured to direct the routing of communications of disparate types between mobile communications devices 30 via the mobile network 20 and/or the WLAN 22, and further with communications devices (including landlines) of the PSTN 34 and additional mobile networks as needed.

The communications routing system 42 may include one or more databases to manage associations between account identifiers, device identifiers, mobile directory numbers, a log of communications events, and the like. The communications routing system 42 further includes a routing engine configured to respond to incoming communications events, route data communications, initiate and end voice calls, and communicate SMS messages. The communications routing system 42 may also include a plurality of servers to interface with the VoIP service 40 and the mobile network 20, as well as a load balancer to balance requests from the communications devices among the servers. The communications routing system 42 may also include other components, including switches, billing systems, routing engines, and the like, to facilitate the functionality performed by the communications routing system 42.

As will be appreciated, the communications system 100 may include other components to improve and facilitate communications in the communications system 100. For example, the communications system 100 may include a push notification service to push notifications of communications events to destination communications devices. The communications system 100 may include a proxy configured to handle VoIP call handoffs and to prioritize communications events associated with emergency calls (e.g., as an alternative to the communications routing system 42 handling such). The communications system 100 may include an interoperation service connecting the communications routing system 42 to the mobile network 20 via the wide-area IP network 24 to interface with the mobile network 20 and to facilitate data communications between the communications routing system 42 and the mobile network 20. The communications system 100 may include a quality of service server to determine the performance of data channels, implemented, for example as a standalone component, or as a subcomponent of another component, such as the VoIP service 40 or the communications routing system 42. The communications system 100 may further include an advertising server, for example operated by one or more intermediaries, to obtain and display advertisements at communications devices 30, 32.

An outgoing voice call from a communications device 30, 32 may be conducted as follows. The communications device 30, 32 sends a call request to the VoIP service 40 via the WLAN 22, if connected, or otherwise via the mobile network 20. If the destination device is on the PSTN 34, the VoIP service 40 completes the call via the PSTN 34. The VoIP service 40 may additionally notify the communications routing system 42 of the call request, call initiation, and call termination. The outgoing voice call event may then be recorded in the associated account data in the communications routing system 42 so that it may be synchronized with the client programs on other communications devices 30, 32 associated with an account identifier of the account data.

An incoming voice calls may also arrive at the VoIP service 40 via the mobile network 20 or the WLAN 22. The VoIP service 40 notifies the communications routing system 42 of a call request for a particular endpoint destination communications device 30, 32. The communications routing system 42 may then issue a push notification to one or all of the endpoint destination communications devices 30, 32 associated with the VoIP telephone number to notify the destination communications devices 30, 32 of the call. If a user of one of the destination communications devices 30, 32 accepts the call, the destination communications device 30, 32 notifies the VoIP service 40 of call acceptance. The VoIP service 40 may then notify the communications routing system 42 of call initiation and call termination.

Incoming and outgoing voice calls made to or from a communications device 30, 32 associated with the communications routing system 42 are made using the VoIP telephone number, which is established at the VoIP service 40. When such a call is conducted as data via the mobile network 20, the second MDN of the relevant mobile communications device 30 may be used to track the data usage on the mobile network 20. As will be appreciated, the system 100 may further employ a proxy, perform SIP registrations, generate push notifications, or the like to support incoming and outgoing voice calls from a communications device 30, 32.

In operation, voice calls are carried out between source devices and destination devices (i.e., communication devices 30, 32), as supported, at least in part, by the VoIP service 40. Voice calls are defined by one or more legs, each leg having an encoding device and a receiving device. The legs of a voice call may be defined by different devices through which the audio stream is relayed from the source device to the destination device. For example, a first leg may be defined by the source device (one of the communications devices 30, 32), acting as the encoding device, and the VoIP service 40, acting as the receiving device. A second leg may be defined by the VoIP service 40, acting as the encoding device, and the destination device (another one of the communications devices 30, 32). The digital audio stream of voice calls flows bidirectionally between these points. The audio stream is encoded at each encoding device and decoded at each receiving device, including transcoding, where necessary, at intermediary points (e.g., the VoIP service 40). It will be further understood that a device may act as an encoding device when audio data is being transmitted, and that the same device may act as the receiving device to receive audio data, as appropriate during a voice call.

The system 100 employs a feedback controller to improve quality at each leg. In particular, the encoding device of each leg is configured to encode an analog audio stream to a digital audio stream according to one or more input parameters, such as bandwidth, bitrate, jitter buffer size, forward error correction (FEC), packet loss concealment (PLC), and the like. The input parameters may include fixed input parameters and variable input parameters, which may be updated and configured to improve quality of the received audio stream. The digital audio stream, which is the sampled and packetized version of the analog audio stream, is transmitted to the receiving device for the leg. The receiving device is configured to analyze the received audio stream and send a quality indicator to the encoding device. The quality indicator represents the quality of the digital audio stream received at the receiving device, and may be determined based on network statistics, such as packet loss, latency, jitter, and the like, or a computed mean opinion score (MOS) representing the perceived quality of a voice call. The encoding device is further configured to, at a feedback controller, determine updated variable input parameters for encoding subsequent analog audio streams. For example, the feedback controller may configure or update the variable input parameters according to proportional-integral-derivative (PID) control or computations. Thus, the feedback controller may update, in real-time, the variable input parameters to improve the perceived quality of subsequently encoded analog audio streams.

The presently described feedback control may be implemented in digital communication links between encoding devices and receiving devices to improve voice quality between these two communications devices. Additionally, the presently described feedback control may be implemented independently at independent legs on a voice call between a source device and a destination device to improve voice quality at each leg, with encoding input parameters updated for improving voice quality at the given leg. Advantageously, the quality indicator may be received at the encoding device in real-time, during a voice call to continually adjust the variable input parameters as the network statistics change, thereby maintaining high audio quality throughout the voice call. Further, the feedback controller may employ a PID controller for each of the variable input parameters to allow more precise adjustments for each variable input parameter.

Figure 2:
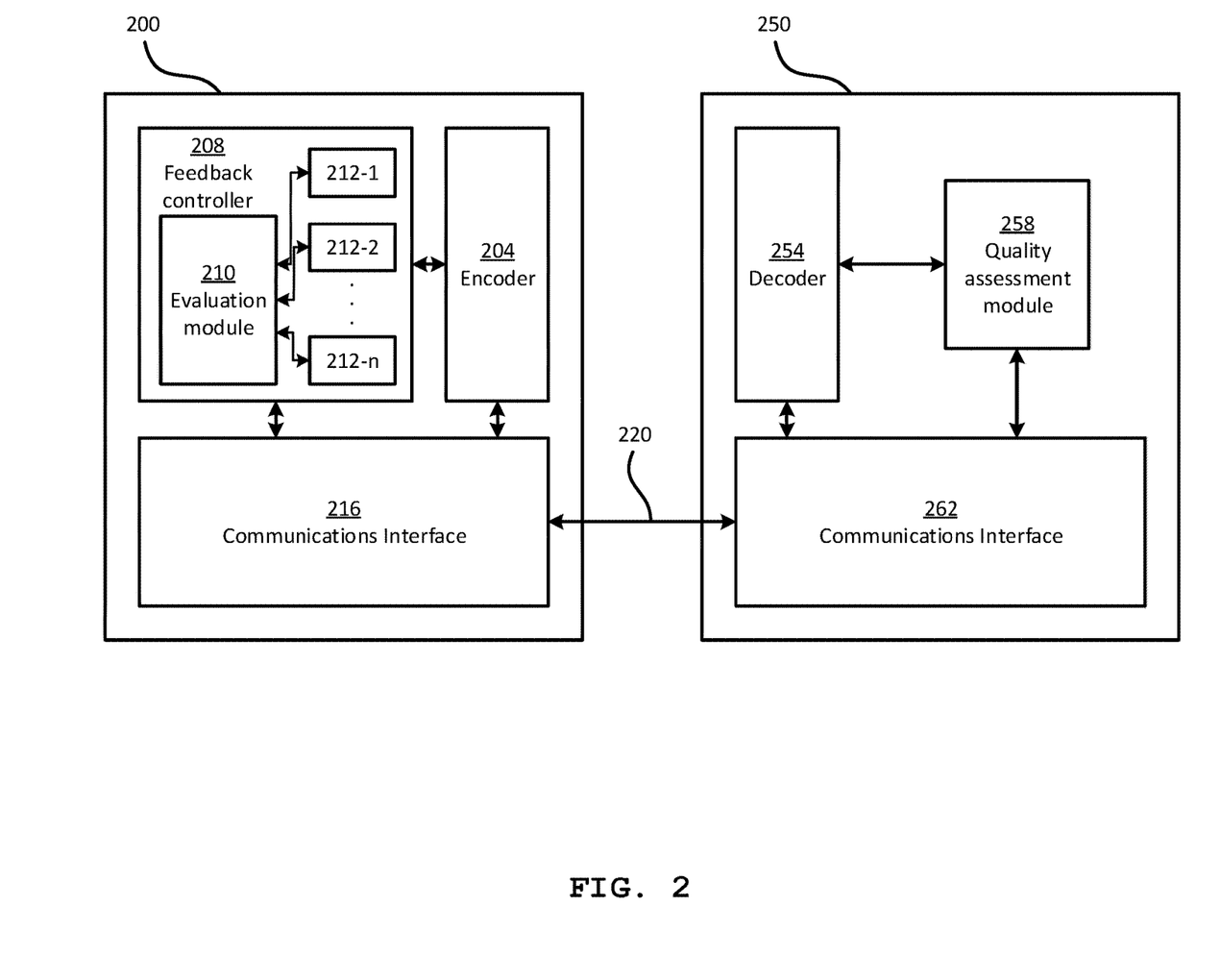
FIG. 2 depicts an encoding device and a receiving device of a leg of a voice call in the communications system of FIG. 1.

Referring now to FIG. 2, a block diagram of an encoding device 200 and a receiving device 250 of a leg of a voice call. The encoding device 200 includes an encoder 204, a feedback controller 208, and a communications interface 216. The receiving device 250 includes a decoder 254, a quality assessment module 258, and a communications interface 262.

The encoder 204 is configured to receive an analog audio stream and encode the analog audio stream to a digital audio stream. For example, when a source communications device 30, 32 is acting as an encoding device, the analog audio stream may be received from an audio receiver (e.g., a microphone) of the source communications device 30, 32. In another example, when the VoIP service 40 acts as the encoding device, the analog audio stream may be received from a decoder, after decoding an incoming digital audio stream received from a source communications device 30, 32. The encoder 204 may be, for example, an Opus encoder, or the like.

In particular, the encoder 204 is configured to encode the analog audio stream according to one or more input parameters. For example, the input parameters may include one or more of: bandwidth (i.e., the band of frequencies that the audio stream is being constrained to), bitrate (i.e., the bit rate of the encoded audio stream for transmission), jitter buffer size (i.e., audio samples held in the buffer before being played back on the receiving device, as measured in milliseconds), forward error correction, packet loss concealment, and the like. The input parameters may include both fixed parameters and variable input parameters. For example, the encoder 204 may encode the analog audio stream according to one or more fixed parameters, stored in a memory accessible by the encoder 204, as well as one or more variable input parameters received from the feedback controller 208.

Accordingly, the encoder 204 is interconnected with the feedback controller 208 to receive one or more of the variable input parameters defining the encoding operation. The feedback controller 208 is configured to generate and adjust the variable input parameters for encoding operations to improve the quality of the digital analog stream received at the receiving device 250. In particular, the feedback controller 208 is configured to receive a quality indicator representing a quality of the digital audio stream received at the receiving device. For example, the quality indicator may include a mean opinion score (MOS) representing the perceived quality of a voice call, or a set of network statistics. Based on the quality indicator, the feedback controller 208 determines updated variable input parameters.

Accordingly, the feedback controller 208 may include an evaluation module 210. The evaluation module 210 is configured to receive the quality indicator and process the quality indicator to generate an error term for use by the feedback controller 208 to determine the updated variable input parameters. For example, the evaluation module 210 may receive a set of network statistics (e.g., including packet loss, latency, jitter, and the like) from the receiving device 250 and compute the MOS based on the network statistics. As will be appreciated, in other examples, other scoring or quantitative measures may be used to represent the quality of the audio stream received by the receiving device 250, based on the quality indicator.

The evaluation module 210 may additionally compute an error function e(t) as a difference the mean opinion score (MOS) measured or computed by the receiving device 250 and communicated as the quality indicator, and a MOS setpoint value, set to represent a desired quality level. In other examples, the error function e(t) may be computed by other suitable functions, as will be appreciated by persons of skill in the art.

The feedback controller 208 may additionally include a proportional-integral-derivative (PID) controller (i.e., a controller employing a proportional-integral-derivative control loop mechanism). More particularly, the feedback controller 208 may include a PID controller 212-1, 212-2, through 212-$n$ (referred to generically as a PID controller 212 and collectively as the PID controllers 212) for each variable input parameter $a_1$, $a_2$, through an. The PID controllers 212 may receive the error term from the evaluation module 210 and determine the variable input parameters based on the error term. More particularly, each PID controller 212 is employs a control function represented by equation (1):

$$u(t) = K_p e(t) + K_i \int_0^t e(t')dt' + K_d \frac{de(t)}{dt} \tag{1}$$

In equation (1), the term $K_p e(t)$ represents the proportional control term, the term $K_i \int_0^t e(t')dt'$ represents the integral control term, and the term $$K_d \frac{de(t)}{dt}$$

represents the derivative control term. The coefficients $K_p$, $K_i$, and $K_d$ for the proportional, integral, and derivative terms respectively, are constants determined from optimizing or tuning each of the PID controllers 212. For example, the PID controllers 212 may be tuned according to manual methods, the Ziegler-Nichols tuning method, other heuristic methods, or the like, as will be appreciated by persons of skill in the art. These coefficients may be stored in a memory accessible to the encoder 204. The proportional, integral and derivative terms are summed to output u(t), which provides the variable input parameters $a_1$, $a_2$, through an at each respective PID controller 212.

The encoding device 200 also includes the communications interface 216 interconnected with the encoder 204. The communications interface 216 includes suitable hardware (e.g., transmitters, receivers, network interface controllers and the like) allowing the encoding device 200 to communicate with other computing devices, such as the receiving device 250, via a communications link 220. The specific components of the communications interface 216 are selected based on the type of network or other links that the encoding device 200 communicates over. In particular, the encoding device 200 is configured to communicate digital audio streams (i.e., representing audio data during a voice call) to the receiving device 250 via the communications interface 216. The encoding device 200 is further configured to receive quality indicators from the receiving device 250 via the communications interface 216.

The receiving device 250 includes the decoder 254, configured to receive a digital audio stream and decode the digital audio stream to an analog audio stream. In particular, the decoder 254 may receive the digital audio stream from an encoding device, such as the encoding device 200, via the communications interface 262. The decoder 254 may be configured to output the analog audio stream, for example to an audio output device (e.g., a speaker), for example when a source communications device 30, 32 is acting as a receiving device. In another example, when the VoIP service 40 acts as the receiving device, the analog audio stream may be sent to an encoder to be transcoded for a subsequent leg. The decoder 254 may be, for example, an Opus decoder, or the like.

The decoder 254 is further interconnected with the quality assessment module 258 and may send the digital and/or analog audio stream to the quality assessment module 258. The quality assessment module 258 is configured to assess the quality of the received digital and/or analog audio stream. For example, the quality assessment module 258 may obtain network statistics and configuration values from the network (e.g., the IP network 24) itself. In other examples, the quality assessment module 258 may obtain network statistics from the digital audio stream as received at the receiving device 250 or from the analog audio stream as received from the decoder 254. The quality assessment module 258 may then return the network statistics, via the communications interface 262, as a quality indicator to the encoding device from which the digital audio stream was received. In some examples, the quality assessment module 258 may be integrated with the decoder 254.

The communications interface 262 is therefore interconnected with the decoder 254 and the quality assessment module 258. The communications interface 262 includes suitable hardware (e.g., transmitters, receivers, network interface controllers and the like) allowing the receiving device 250 to communicate with other computing devices, such as the encoding device 200, via the communications link 220. The specific components of the communications interface 262 are selected based on the type of network or other links that the receiving device 250 communicates over. In particular, the receiving device 250 is configured to receive digital audio streams from the encoding device 200 via the communications interface 262. The receiving device 250 is further configured to transmit quality indicators to the encoding device 200 via the communications interface 262.

Figure 3:
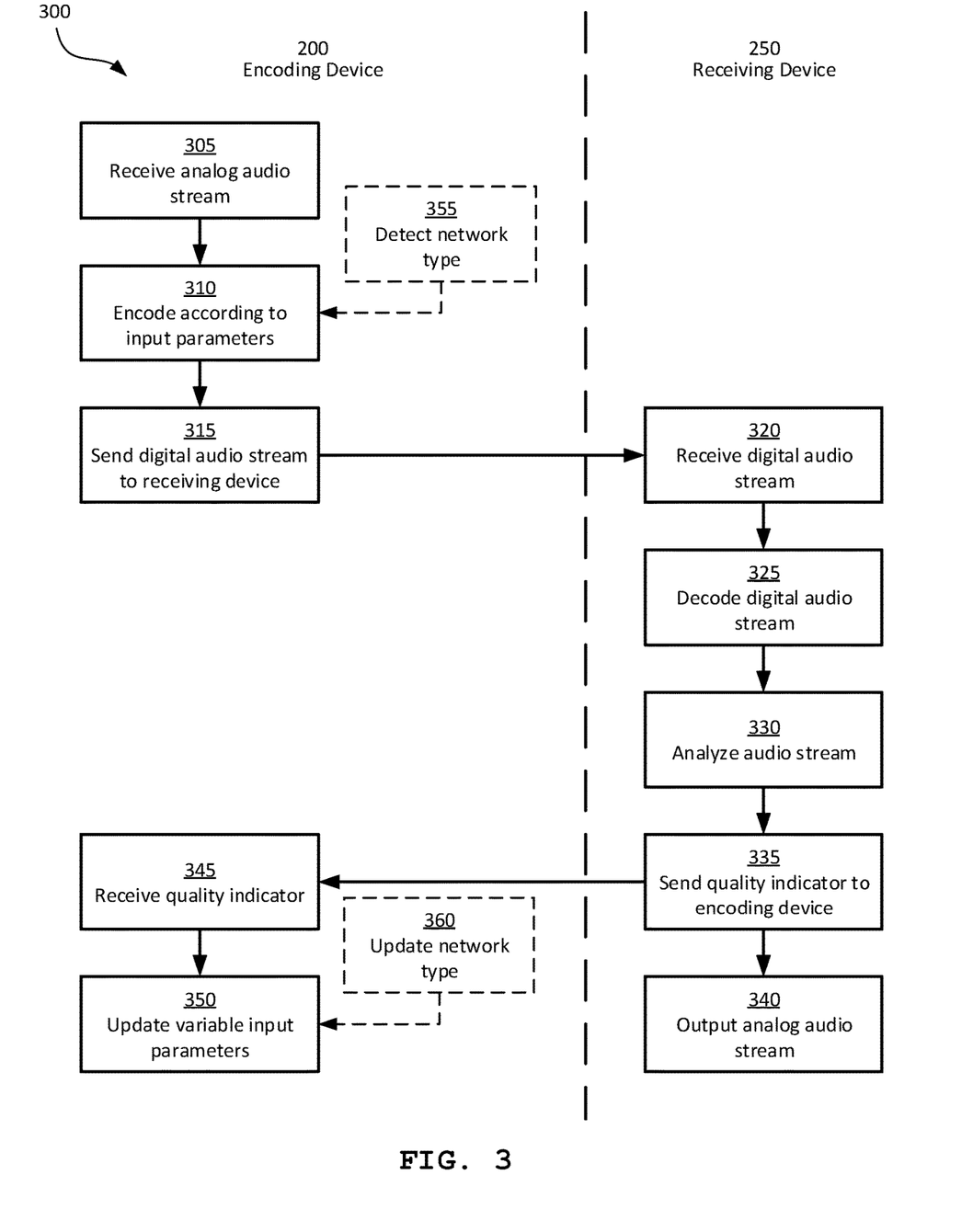
FIG. 3 depicts a flowchart of an example method for improving audio quality using feedback control in the communications system of FIG. 1.

Turning now to FIG. 3, a flowchart depicting an example method 300 of improving audio quality using feedback control is provided. The method 300 will be described in conjunction with its performance in the system 100, and in particular, as performed by the encoding device 200 and the receiving device 250. As previously noted, the encoding device 200 and the receiving device 250 represent endpoint devices at specific legs within a communications route in the system 100. For example, they may represent a source communications device 30, 32 and the VoIP service 40 respectively, during a first leg, or the VoIP service 40, and a destination communications device 30, 32 respectively, during a second leg. The method 300 will additionally be described in conjunction with FIG. 4, which depicts a schematic diagram of the flow of data during a performance of the method 300.

At block 305, the encoding device 200, and in particular, the encoder 204, receives an analog audio stream to be encoded and sent to the receiving device 250. That is, at 405 of FIG. 4, the analog audio stream is received from an audio source. The audio source may be, for example, an audio receiver (i.e., a microphone of a communications device 30, 32) or a decoder (e.g., a decoder of the VoIP service 40).

Figure 4:
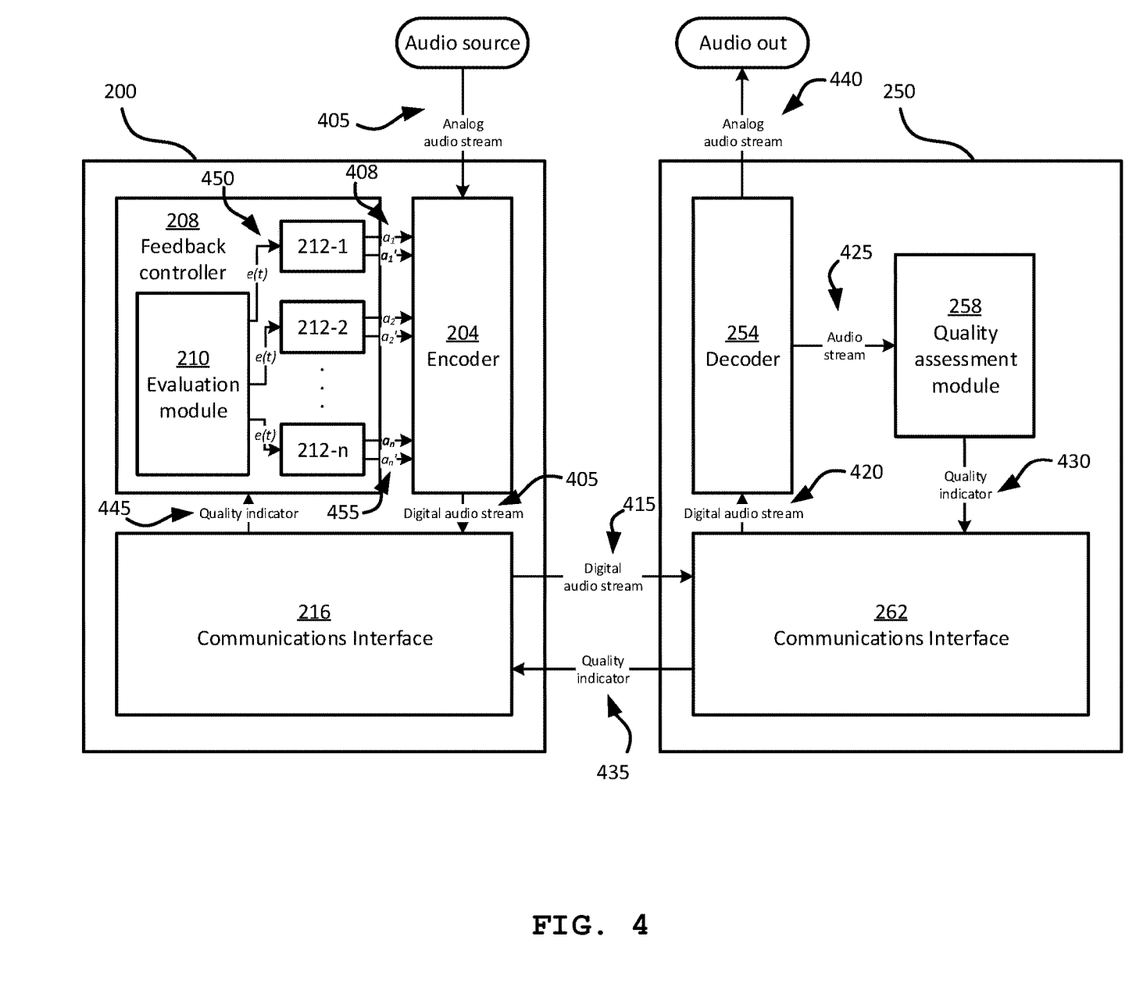
FIG. 4 depicts a schematic diagram of the flow of data in the communications system of FIG. 1 during execution of the method of FIG. 3.

At block 310, the encoding device 200, and in particular, the encoder 204, encodes the analog audio stream into a digital audio stream. The encoder 204 may obtain various input parameters, including fixed input parameters from a memory accessible to the encoder 204, and variable input parameters from the feedback controller 208. For example, the variable input parameters may include bandwidth, bitrate, and jitter buffer size. In particular, at an initial interval, at time t=0, the error function e(t) is zero, and the PID controllers 212 may output initial variable input parameters $a_1$, $a_2$, through an to the encoder 204 to encode the analog audio stream. Thus, at 408, the feedback controller 208 provides the initial variable input parameters to the encoder 204. At 410, the encoder 204 outputs a digital audio stream for transmission to the receiving device 250. In particular, the digital audio stream may be communicated to the communications interface 216 for transmission to the receiving device 250.

At block 315, the encoding device 200, and in particular, the communications interface 216, transmits the digital audio stream to the receiving device 250, and in particular, the communications interface 262. The transmission of the digital audio stream from the encoding device 200 to the receiving device 250 is depicted at 415. For example, the communications interface 216 may be configured to employ a real-time transport protocol (RTP) to send audio streams. In particular, the encoding device 200 may be configured to send the audio stream over an IP network, such as the network 24, which employs RTP standards to deliver audio (and video) streams. The receiving device 250, and in particular, the communications interface 262, may thus similarly be capable of receiving and decoding RTP audio streams.

At block 320, the digital audio stream is received at the receiving device 250, and in particular, by the communications interface 262. Upon receiving the digital audio stream, the communications interface 262 may communicate the digital audio stream to the decoder 254 at 420.

At block 325, the receiving device 250, and in particular, the decoder 254, decodes the digital audio stream to generate an analog audio stream. The decoder 254 may employ standard decoding protocols according to decode the digital audio stream, and outputs the analog audio stream at 425.

At block 330, the receiving device 250, and in particular, the quality assessment module 258 analyzes the audio stream and generates a quality indicator. The quality assessment module 258 may analyze the digital audio stream or the analog audio stream to determine the quality of the received audio stream. For example, the quality assessment module 258 may obtain network statistics, including packet loss, latency, jitter, and the like over a given real-time transport control protocol (RTCP) interval. In some examples, the quality assessment module 258 may generate a quality indicator including the raw data values representing packet loss, latency, and jitter. In other examples, the quality assessment module 258 may compute the MOS for the given interval based on the packet loss, latency, jitter, and other network statistics and generate a quality indicator including the computed MOS. At 430, the quality assessment module 258 outputs the quality indicator to the communications interface 262 for transmission to the encoding device 200.

At block 335, the receiving device 250, and in particular, the communications interface 262, transmits the quality indicator to the encoding device, and in particular, the communications interface 216. The transmission of the quality indicator from the receiving device 250 to the encoding device 200 is depicted at 435.

At block 340, the receiving device 250 outputs the decoded analog audio stream. That is, at 440, the audio stream is output, for example, to an audio output device (e.g., a speaker of a communications device 30, 32), or an encoder (e.g., an encoder of the VoIP service 40).

At block 345, the encoding device 200, and in particular, the communications interface 216, receives the quality indicator from the receiving device 250. Upon receiving the quality indicator, the communications interface 216 may communicate the quality indicator to the feedback controller 208 at 445.

At block 350, the encoding device 200, and in particular, the feedback controller 208, determines updated variable input parameters. The feedback controller 208 provides the updated variable input parameters to the encoder 204 for encoding subsequent analog audio streams.

Figure 5:
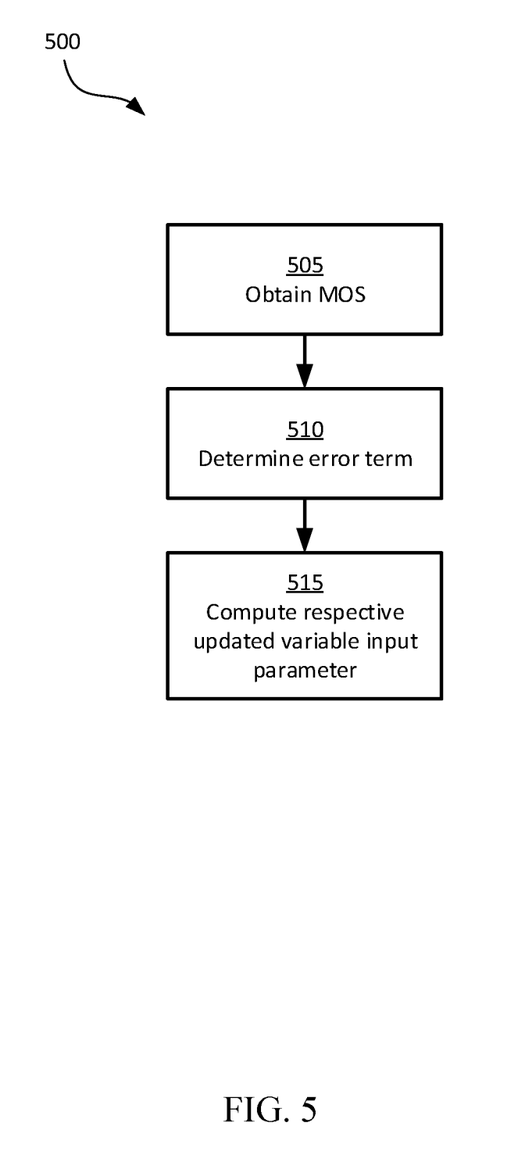
FIG. 5 depicts a flowchart of an example method of updating variable input parameters at block 350 of the method of FIG. 3.

For example, referring to FIG. 5, an example method 500 of updating the variable input parameters is depicted.

At block 505, the feedback controller 208, and in particular, the evaluation module 210, obtains a MOS based on the quality indicator. For example, the evaluation module 210 may compute the MOS based on network statistics, including packet loss, latency, and jitter defined in the quality indicator. In other examples, the evaluation module 210 may simply extract the MOS from the quality indicator (e.g., in examples where the receiving device 250 computes the MOS based on the network statistics).

At block 510, the feedback controller 208, and in particular, the evaluation module 210, determines the error term e(t) at the time t by comparing the computed MOS from block 505 to the MOS setpoint value. For example, the evaluation module 210 may subtract the compute MOS from the MOS setpoint value. Having computed the error function e(t), the evaluation module 210 outputs the error term e(t) to each PID controller 212, at 450 of FIG. 4.

At block 515, each PID controller 212 computes its respective updated variable input parameter based on the error function e(t). In particular, each PID controller 212 computes a proportional term, an integral term, and a derivative term, and sums them, per equation (1) to compute the updated variable input parameters $a_1'$, $a_2'$, through $a_n'$. The updated variable input parameters $a_1'$, $a_2'$, through $a_n'$ are output to the encoder 204 at 455.

As will be appreciated, in some examples, other variations are possible. For example, the encoding device 200 may additionally consider the network type when encoding the analog audio stream. For example, returning to FIG. 3, optionally, at block 355, the encoding device 200 may detect the network type of the network over which the digital audio stream is to be transmitted. For example, network type may include Wi-Fi, LTE, 3G, or other suitable WLAN or mobile networks. The network type may be transmitted to the feedback controller 208 to generate the initial variable input parameters.

That is, the feedback controller 208 may be configured to determine the initial variable input parameters in consideration of the network type. More specifically, the network type may affect the coefficients $K_p$, $K_i$, and $K_d$. Accordingly, the feedback controller 208 may retrieve the coefficients $K_p$, $K_i$, and $K_d$ corresponding to the network type. For example, these constants may be pre-determined (e.g., based on a tuning method), and stored in a memory accessible by the feedback controller 208. The feedback controller 208 may then proceed to compute the initial variable input parameters based on the coefficients corresponding to the network type.

Additionally, in some examples, the network type may change over the course of the voice call. For example, the voice call may be alternately carried over the mobile network 20 or the WLAN 22 based, for example, on the respective quality of each network. Accordingly, optionally, at block 360, the encoding 200 may detect a change in the network type. The updated network type may be transmitted to the feedback controller 208 to generate the updated variable input parameters.

That is, the feedback controller 208 may be configured to determine the updated variable input parameters based on the quality indicator, and further in consideration of the network type. The feedback controller 208 may retrieve the coefficients $K_p$, $K_i$, and $K_d$ corresponding to the network type and use the coefficients to compute the updated variable input parameters. For example, Table 1 depicts an example table storing the $K_p$, $K_i$, and $K_d$ corresponding to network types.

TABLE 1

| PID coefficients by network type | | | |
|---|---|---|---|
| Network Type | $K_p$ | $K_i$ | $K_d$ |
| Wi-Fi | 4.7 | 4.5 | 3.1 |
| LAN | 4.5 | 4.3 | 2.9 |
| Cell | 3.3 | 2.5 | 2.1 |
| Other | 4.5 | 4.5 | 2.8 |

As can be seen, the coefficients may vary from between network types. Additionally, the encoding device 200 may store coefficients for "other" networks, such as when the network type is unidentified or does not have specifically computed coefficients.

As described above, a communications system, device, and method are provided to improve audio quality during a voice call using feedback control. In particular, a receiving device may provide a quality indicator, such as a mean opinion score, to the encoding device to allow the encoding device to adjust and fine-tune variable input parameters of the encoding operation. For example, the encoding device may employ proportional-integral-derivative controllers for each variable input parameter. Such a feedback loop may be implemented at each leg of a voice call (i.e., between each pair of communications devices required to relay the voice call from the source device to the destination device). Advantageously, such a feedback loop may be implemented in real time to continually adjust the variable input parameters in response to changes in network statistics, network type, and other factors affecting audio quality of the voice call.

The scope of the claims should not be limited by the embodiments set forth in the above examples, but should be given the broadest interpretation consistent with the description as a whole.

The invention claimed is:

1. A communications system comprising:
   a source device and a destination device, each coupled to one or more of a wide-area internet protocol (IP) network, a public-switched telephone network;
   a Voice over Internet Protocol (VoIP) service coupled to the wide-area IP network and the public-switched telephone network, the VoIP service configured to support a voice call between the source device and the destination device;

wherein, for at least one leg in the voice call:
an encoding device is configured to encode an analog audio stream to a digital audio stream according to one or more input parameters, the input parameters including variable input parameters;
a receiving device is configured to send a quality indicator to the encoding device, the quality indicator representing a quality of the digital audio stream received at the receiving device, wherein the receiving device is separate from the communication device; and
the encoding device is configured to, at a feedback controller, determine updated variable input parameters for encoding a subsequent analog audio stream.

2. The communications system of claim 1, wherein the feedback controller comprises a proportional-integral-derivative controller configured to employ a proportional-integral-derivative control loop to determine the updated variable input parameters.

3. The communications system of claim 1, wherein the feedback controller comprises, for each variable input parameter, a respective proportional-integral-derivative controller configured to employ a proportional-integral-derivative control loop to determine the updated variable input parameter.

4. The communications system of claim 1, wherein the one leg is defined by the source device acting as the encoding device, and the VoIP service acting as the receiving device.

5. The communications system of claim 4, wherein the VoIP service is further configured to transcode the digital audio stream for a second leg defined by the VoIP service acting as the encoding device and the destination device acting as the receiving device.

6. The communications system of claim 1, wherein the one leg is defined by the VoIP service acting as the encoding device and the destination device acting as the receiving device.

7. The communications system of claim 1, wherein the quality indicator includes one or more of: packet loss, latency, jitter, and a computed mean opinion score.

8. The communications system of claim 1, wherein the variable input parameters include one or more of: bandwidth, bitrate, jitter buffer size, forward error correction, and packet loss concealment.

9. The communications system of claim 1, wherein the encoding device is further configured to:
determine a network type for transmission of the digital audio stream; and
determine the updated variable input parameters further in consideration of the network type.

10. A communications device comprising:
an encoder configured to encode an analog audio stream to a digital audio stream according to one or more input parameters, the input parameters including variable input parameters;
a communications interface configured to send the digital audio stream to a receiving device, wherein the receiving device is separate from the communication device; and
a feedback controller configured to:
receive a quality indicator representing a quality of the digital audio stream received at the receiving device;
determine, based on the quality indicator, updated variable input parameters; and
provide the updated variable input parameters to the encoder.

11. The communications device of claim 10, wherein the feedback controller comprises a proportional integral derivative controller.

12. The communications device of claim 10, wherein the feedback controller comprises, for each variable input parameter, a respective proportional integral derivative controller.

13. The communications device of claim 10, further comprising an audio receiver configured to receive the analog audio stream.

14. The communications device of claim 10, wherein the communications interface is configured to receive an incoming digital audio stream; and
wherein the communications device further comprises a decoder configured to decode the incoming digital audio stream to generate the analog audio stream.

15. The communications device of claim 10, wherein the feedback controller is further configured to:
receive a network indicator representing a network type for transmission of the digital audio stream; and
determine the updated variable input parameters further in consideration of the network indicator.

16. A method in a communications system, the method comprising:
encoding, at an encoding device, an analog audio stream to a digital audio stream according to one or more input parameters, the input parameters including initial variable input parameters;
sending the digital audio stream to a receiving device, wherein the receiving device is separate from the communication device;
receiving, at the encoding device, a quality indicator representing a quality of the digital audio stream received at the receiving device;
determining, based on the quality indicator, updated variable input parameters; and
providing the updated variable input parameters for encoding a subsequent analog audio stream.

17. The method of claim 16, further comprising encoding, at the encoding device, the subsequent analog audio stream according to the updated variable input parameters.

18. The method of claim 16, wherein determining the updated variable input parameters comprises:
obtaining a computed mean opinion score for the digital audio stream;
determining an error term based on the computed mean opinion score; and
computing each respective updated variable input parameter based on the error term.

19. The method of claim 18, wherein computing each respective updated variable input parameter comprises:
computing a proportional term, an integral term, and a derivative term; and
summing the proportional term, the integral term, and the derivative term to compute the respective updated variable input parameter.

20. The method of claim 16, further comprising:
detecting a network type;
retrieving coefficients corresponding to the network type; and
computing the initial variable input parameters based on the coefficients corresponding to the network type.

21. The method of claim 20, further comprising:
detecting an updated network type;
retrieving further coefficients corresponding to the updated network type; and computing the updated variable input parameters further based on the further coefficients corresponding to the updated network type.

\* \* \* \* \*